United States Patent [19]

Sugawara

[11] Patent Number: 5,136,427
[45] Date of Patent: Aug. 4, 1992

[54] OPTICAL SYSTEM FOR USE WITH A VIEWFINDER

[75] Inventor: Saburo Sugawara, Kanagawa, Japan

[73] Assignee: Asahi Kogaku K.K., Tokyo, Japan

[21] Appl. No.: 549,987

[22] Filed: Jul. 9, 1990

Related U.S. Application Data

[63] Continuation-in-part of Ser. No. 461,512, Jan. 5, 1990, abandoned.

[30] Foreign Application Priority Data

Jan. 9, 1989 [JP] Japan .................................. 1-2331
Jun. 20, 1990 [JP] Japan .............................. 2-162263

[51] Int. Cl.$^5$ ...................... G02B 25/00; G02B 13/18; G02B 17/00; G02B 13/02
[52] U.S. Cl. .................................. 359/646; 354/219; 359/647; 359/717; 359/718; 359/730
[58] Field of Search ............... 350/410, 432; 354/219; 359/646, 708, 715, 726, 647, 717, 718, 730

[56] References Cited

U.S. PATENT DOCUMENTS

4,265,529  5/1981  Yokota .................. 350/410
4,289,392  9/1981  Kobori et al. .......... 354/225

FOREIGN PATENT DOCUMENTS

1800365  9/1976  Fed. Rep. of Germany.
0135657 11/1978  Japan ..................... 350/410
57-54931  4/1982  Japan.

OTHER PUBLICATIONS

"Injection Molding of Plastic Optics", Ulrich Greis, Gunther Kirchof, *Proceedings*, vol. 381, Apr. 1983.

*Primary Examiner*—Scott J. Sugarman
*Attorney, Agent, or Firm*—Sughrue, Mion, Zinn, Macpeak & Seas

[57] ABSTRACT

An optical system for use in conjunction with a camera viewfinder having a penta-mirror comprises a positive first lens element and a negative second lens element satisfying predetermined conditions.

25 Claims, 18 Drawing Sheets

COMA

COMA

COMA

COMA

COMA

COMA

COMA

COMA

COMA

COMA

COMA

COMA

OPTICAL SYSTEM FOR USE WITH A VIEWFINDER

REFERENCE TO RELATED APPLICATION

This a continuation in-part of U.S. patent application Ser. No. 07,461,512 filed Jan. 5, 1990, now abandoned.

BACKGROUND OF THE INVENTION

The present invention relates to an optical system for use with a viewfinder in single-lens reflex cameras that employ a penta-mirror in place of a pentaprism.

Prior art optical systems for use with a viewfinder having a penta-mirror in place of a pentaprism are described in Japanese Utility Model Publication Nos. 48-32325 and 48-10424. These prior art optical systems are advantageous over those which employ a pentaprism in that they suffer a smaller degree of reduction in magnification. On the other hand, they use so many lens elements that the overall length of the lenses in the eyepiece increases, thus making it impossible to realize a compact camera. Further, the use of expensive glass results in a higher production cost.

SUMMARY OF THE INVENTION

It is an object of the present invention to solve the above and other problems of the prior art and to provide an improved optical system for use with a viewfinder that employs a penta-mirror. The system adopts a simple two-unit-two-element composition and yet insures sharp viewing and good performance. Not only is this optical system compact, but it also achieves high magnification and can be manufactured at low cost.

The above and other objects of the present invention are attained by an optical system for use with a viewfinder in a single-lens reflex camera, which optical system comprises, in order from the finder screen side, a first lens unit composed of a positive lens element and a second lens unit composed of a negative lens element. This optical system satisfies the following conditions:

$$-2 < SF1 < 0 \quad (1)$$

$$0 < SF2 < 3 \quad (2)$$

where SF1 is the shape factor of the first lens unit and SF2 is the shape factor of the second lens unit.

In a preferred embodiment, at least one of the four surfaces delineating said first and second lens units is aspheric.

In another preferred embodiment, the optical system further satisfies the following conditions:

$$0.05 < (d_1 + d_2 + d_3)/f < 0.3 \quad (3)$$

where $d_1$ is the thickness of said first lens in the direction of optical axis, $d_2$ is the distance between said first and second lenses on the optical axis, $d_3$ is the thickness of said second lens in the direction of optical axis, and f is the composite focal length of the optical system.

Furthermore, preferably, the optical system meets the following condition:

$$1.0 < f_F/f < 1.3 \quad (4)$$

where $f_F$ is the distance from the finder screen to the first surface of the first lens.

The first lens and the second lens may be cemented together.

The first lens and second lenses are preferably formed of acrylic resin and polycarbonate resin, respectively, or materials having comparable Abbe numbers.

BRIEF DESCRIPTION OF THE DRAWINGS

The invention will be more clearly understood from the following description in conjunction with the accompanying drawings, wherein.

DETAILED DESCRIPTION OF THE PREFERRED EMBODIMENTS

Figure 1:
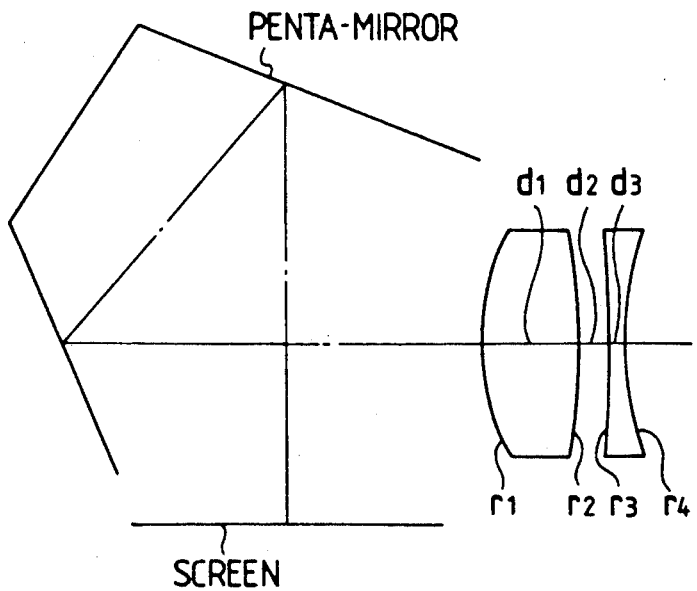
FIGS. 1-13 are simplified cross-sectional views of optical system constructed according to Examples 1-13, respectively.
Figure 2:
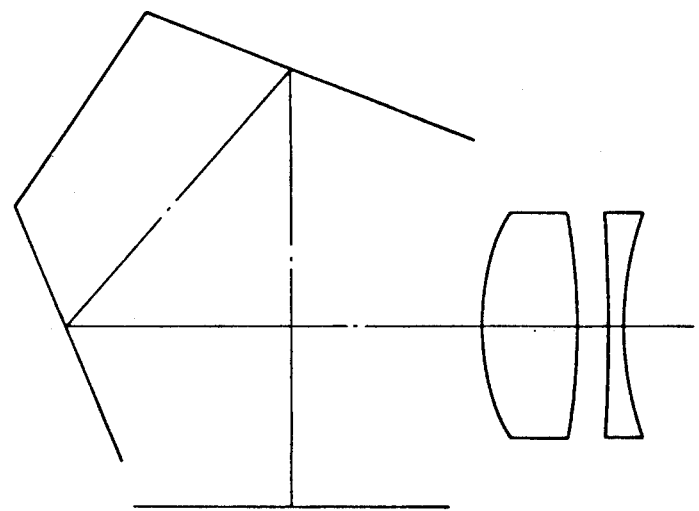
Figure 3:
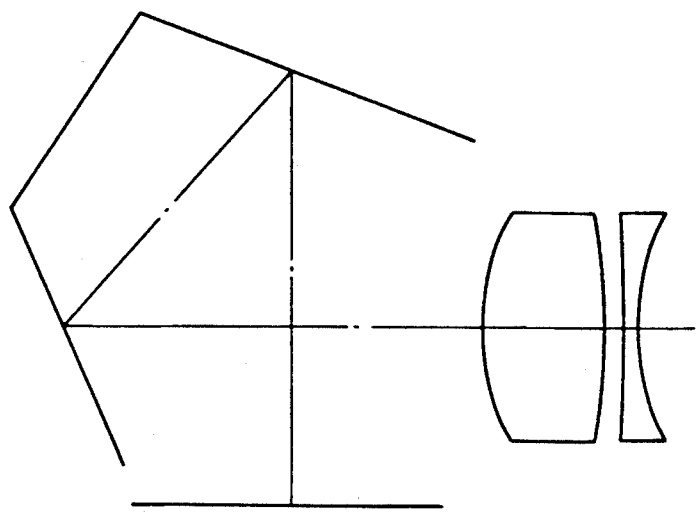
Figure 4:
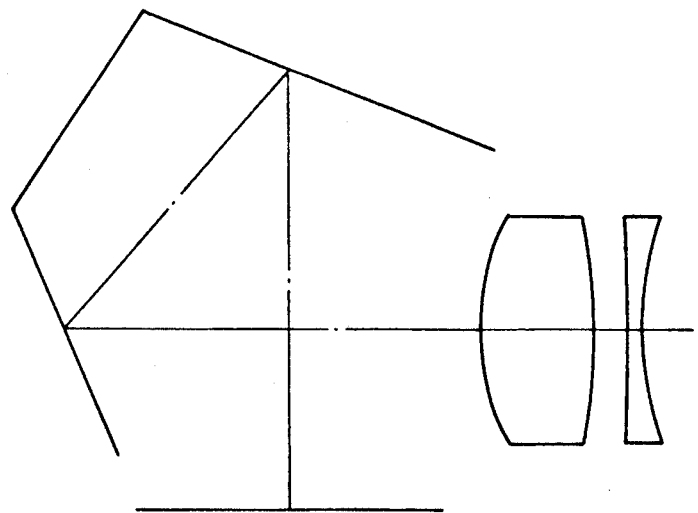
Figure 5:
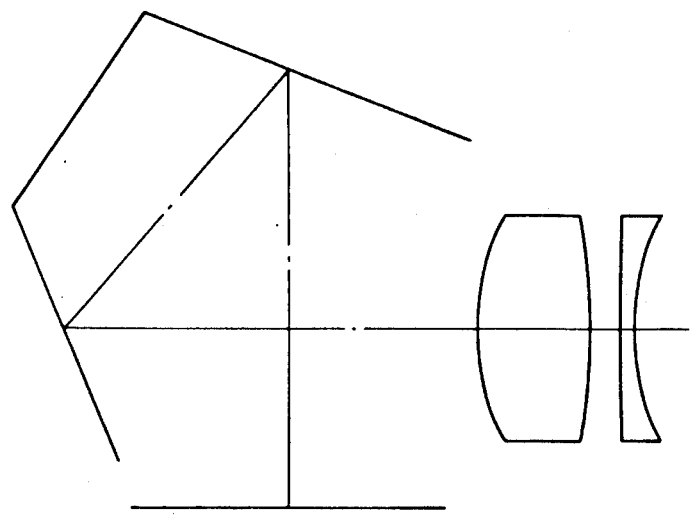
Figure 6:
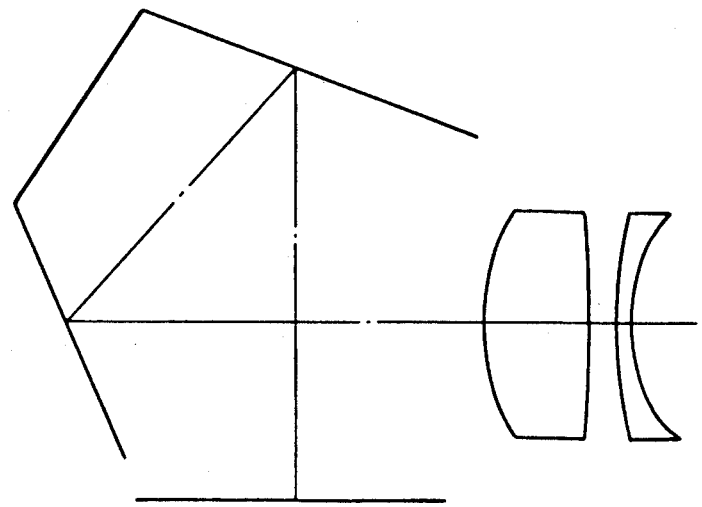
Figure 7:
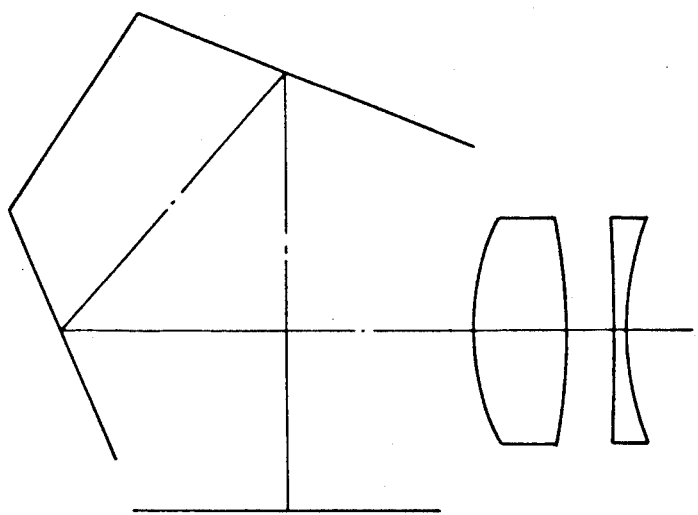
Figure 8:
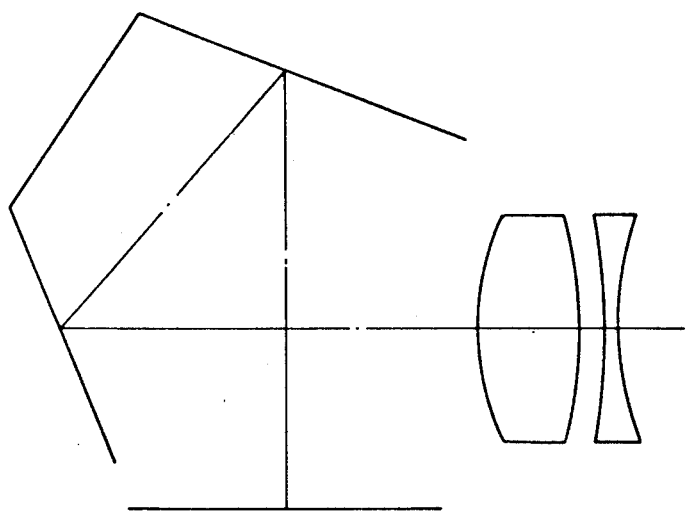
Figure 9:
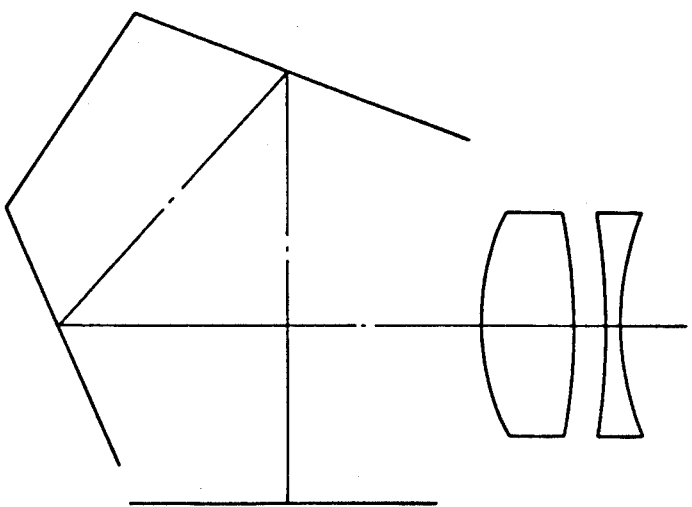
Figure 10:
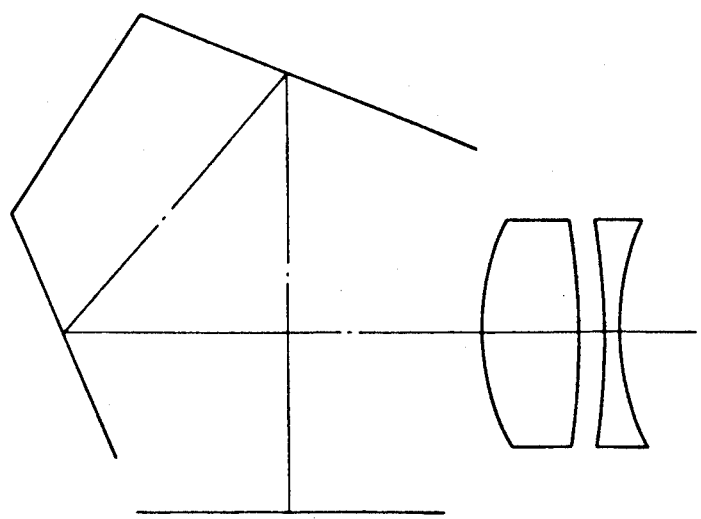
Figure 11:
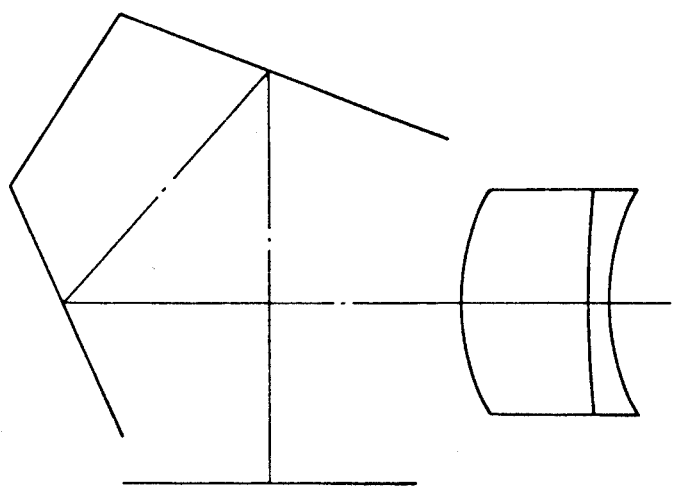
Figure 12:
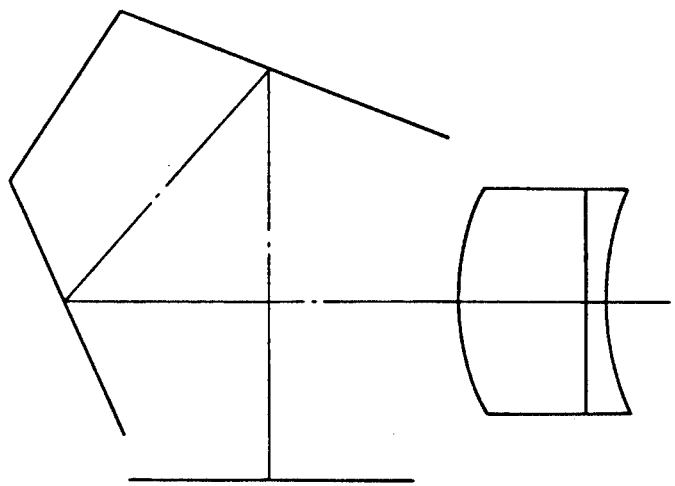
Figure 13:
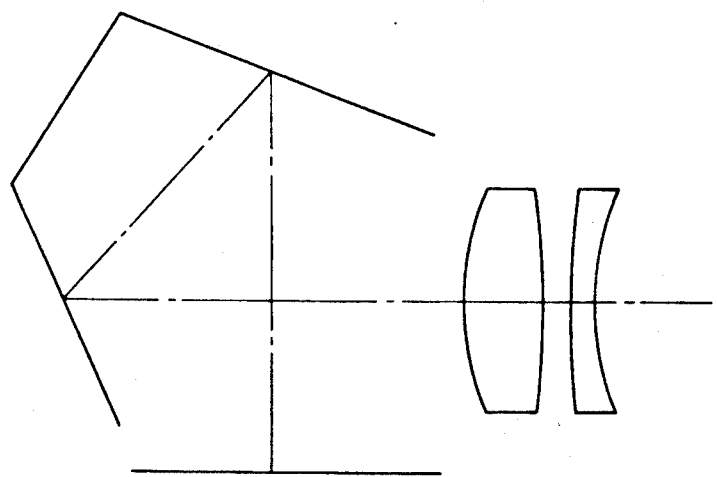

According to the present invention, the optical system comprises, in order from the finder screen side, a first lens unit composed of a positive lens element and a second lens unit composed of a negative lens element. This optical system satisfies the following conditions:

$$-2 < SF1 < 0 \quad (1)$$

$$0 < SF2 < 3 \quad (2)$$

where SF1 is the shape factor of the first lens unit and SF2 is the shape factor of the second lens unit, with the shape factor being given by $SF = (R_s + R_E)/(R_s - R_E)$, where $R_s$ is the radius of curvature of the surface of each lens on the finder screen side and $R_E$ is the radius of curvature of the surface of each lens on the eyepoint side.

Condition (1) sets forth a requirement that should be satisfied by the shape factor of the first lens unit. If SF1 is less than the lower limit of this condition, coma can be easily compensated but spherical aberration is difficult to compensate. If SF1 exceeds the upper limit of this condition, spherical aberration can be easily compensated but coma is difficult to compensate. Further, the distance between the first and second lens units will increase at their marginal areas to cause an undue increase in the effective aperture of the first lens.

Condition (2) sets forth a requirement that should be satisfied by the shape factor SF2 of the second lens unit. If SF2 is less than the lower limit of this condition, coma is difficult to compensate. If SF2 exceeds the upper limit of this condition, the radius of curvature of the surface on the eyepoint side will decrease to produce a virtually short eyepoint.

In order to provide better performance, at least one of the four surfaces delineating the first and second lens units is preferably aspheric. If an aspherica surface is not used, marked coma or changes in eyesight with respect to the center will occur in the marginal area of the visual field. The occurrence of coma is particularly noticeable if the distance between the first and second lens units is increased in order to attain a higher magnification.

In a preferred embodiment, the aspheric surface is preferably of a shape expressed by:

$$X = \frac{Y^2/R}{1 + \sqrt{1 - (K+1)Y^2/R^2}} + \sum_{m=2}^{5} A_{2m} \cdot Y^{2k}$$

where X is the distance measured from the apex along the optical axis in the direction in which rays travel, Y is the height from the optical axis, R is the radius of curvature of a reference spherical plane, K is the shape factor of a rotating quadratic curved plane, and $A_{2m}$ is the asphericity coefficient of a higher degree.

In another preferred embodiment, the optical system further satisfies the following condition:

$$0.05 < (d_1 + d_2 + d_3)/f < 0.3 \qquad (3)$$

where $d_1$ is the thickness of said first lens in the direction of optical axis, $d_2$ is the distance between said first and second lenses on the optical axis, $d_3$ is the thickness of said second lens in the direction of optical axis, and f is the composite focal length of the optical system.

Condition (3) relates to the ratio of the overall length of the optical system to its composite focal length. If the lower limit of this condition is not reached, a desired high magnification is not attainable. If the upper limit of this condition is exceeded, high magnification is attainable, but the effective aperture of the first lens will become large.

Condition (4) defines a distance from the screen of the finder to the first surface of the first lens. If the lower limit would be exceeded, the finder magnification would be decreased and the finder coverage would be unduly decreased. In the worst cases, it would be exceeded, it would be necessary to use a lens having a short radius of curvature, which results in difficulty in manufacturing the lens.

In order to achieve effective compensation for chromatic aberration, it is particularly preferred to make the first lens of an acrylic resin or a Crown glass having an Abbe number comparable to that of any acrylic resin, and to make the second lens of a polycarbonate resin or a flint glass having an Abbe number comparable to that of a polycarbonate resin. The use of resin-made lenses offers the added advantage of lighter weight and lower cost.

In addition, it is possible to cement the first and second lenses together. Also, these two lenses may be formed of acrylic resin. In this case, the machining of the lenses is improved.

Examples 1-13 of the present invention are described below with reference to data sheets, in which SN denotes the surface number, $r_i$ denotes the radius of curvature (in millimeters) of the ith surface, $d_i$ denotes the distance (in millimeters) between the ith and (i+1)th surfaces, $n_j$ denotes the refractive index of the jth lens (optical material) at the d-line, $v_j$ denotes the Abbe number of the jth lens (optical material), $K_i$ denotes the shape factor of a rotating quadratic curved plane for the ith surface, $A_{4i}$ denotes the biquadratic asphericity coefficient of the ith surface, and $A_{6i}$ denotes the triquadratic asphericity coefficient of the ith surface. In each of Examples 1-12, the distance from the fourth surface to the eyepoint is 15 mm and the effective finder coverage is 95%. In Example 13, the distance from the fourth surface to the eyepoint is also 15 but the effective finder coverage is 92%. The distance from the screen to the first surface is 81.004 mm for Examples 1-10, 74.6 mm for Examples 11 and 12, and 75.013 for Example 13.

EXAMPLE 1

| SN | $r_i$ | $d_i$ | $n_j$ | $v_j$ | $K_i$ | $A_{6i}$ |
|---|---|---|---|---|---|---|
| 1 | 15.534 | 6.476 | 1.49186 | 57.4 | −0.23684 | −7.74061 × 10$^{-8}$ |
| 2 | −28.357 | 2.154 | | | −7.37018 | |
| 3 | −53.238 | 1 | 1.58547 | 29.9 | | |
| 4 | 18 | | | | | |

Distance from the screen to the first surface: 81.004
Distance from the fourth surface to the eyepoint: 15
Effective finder voverage: 95%
f = 70.229
Magnification: 0.740X (52/70.229)
SF1 = −0.292
SF2 = 0.495
$(d_1 + d_2 + d_3)/f = 0.137$
$f_F/f = 1.153$

EXAMPLE 2

| SN | $r_i$ | $d_i$ | $n_j$ | $v_j$ | $K_i$ | $A_{6i}$ |
|---|---|---|---|---|---|---|
| 1 | 14.489 | 6.224 | 1.49186 | 57.4 | −0.34447 | −7.28882 × 10$^{-8}$ |
| 2 | −34.501 | 2.005 | | | −11.6694 | |
| 3 | −146.305 | 1 | 1.58547 | 29.9 | | |
| 4 | 15 | | | | | |

Distance from the screen to the first surface: 81.004
Distance from the fourth surface to the eyepoint: 15
Effective finder coverage: 95%
f = 69.961
Magnification: 0.743X (52/69.961)
SF1 = −0.408
SF2 = 0.814
$(d_1 + d_2 + d_3)/f = 0.132$
$f_F/f = 1.158$

EXAMPLE 3

| SN | $r_i$ | $d_i$ | $n_j$ | $v_j$ | $K_i$ | $A_{6i}$ |
|---|---|---|---|---|---|---|
| 1 | 13.231 | 8.203 | 1.49186 | 57.4 | −0.275 | −1.30316 × 10$^{-7}$ |
| 2 | −24.387 | 1.231 | | | −9.80573 | 2.4702 × 10$^{-8}$ |
| 3 | −110.535 | 1 | 1.71736 | 29.3 | | |

-continued

| SN | $r_i$ | $d_i$ | $n_j$ | $\nu_j$ | $K_i$ | $A_{6i}$ |
|---|---|---|---|---|---|---|
| 4 | 15 | | | | | |

Distance from the screen to the first surface: 81.004
Distance from the fourth surface to the eyepoint: 15
Effective finder coverage: 95%
f=67.03
Magnification: 0.776X (52/67.03)
SF1 = −0.297

SF2 = 0.761
$(d_1+d_2+d_3)/f = 0.156$
$f_F/f = 1.208$

EXAMPLE 4

| SN | $r_i$ | $d_i$ | $n_j$ | $\nu_j$ | $K_i$ | $A_{6i}$ |
|---|---|---|---|---|---|---|
| 1 | 14.678 | 7.6 | 1.49186 | 57.4 | −0.38849 | −9.08487 × 10⁻⁸ |
| 2 | −28.267 | 2.153 | | | −9.04108 | |
| 3 | −333.815 | 1 | 1.80518 | 25.4 | | |
| 4 | 18 | | | | | |

Distance from the screen to the first surface: 81.004
Distance from the fourth surface to the eyepoint: 15
Effective finder coverage: 95%
f=67.314
Magnification: 0.772X (52/67.314)
SF1 = −0.316

SF2 = 0.898
$(d_1+d_2+d_3)/f = 0.160$
$f_F/f = 1.203$

EXAMPLE 5

| SN | $r_i$ | $d_i$ | $n_j$ | $\nu_j$ | $K_i$ | $A_{6i}$ |
|---|---|---|---|---|---|---|
| 1 | 13.944 | 7.548 | 1.49186 | 57.4 | −0.43628 | −9.28391 × 10⁻⁸ |
| 2 | −31.306 | 1.94 | | | −12.3174 | |
| 3 | 136.934 | 1 | 1.80518 | 25.4 | | |
| 4 | 15 | | | | | |

Distance from the screen to the first surface: 81.004
Distance from the fourth surface to the eyepoint: 15
Effective finder coverage: 95%
f=66.927
Magnification: 0.777X (52/66.927)

SF1 = −0.384
SF2 = 1.246
$(d_1+d_2+d_3)/f = 0.157$
$f_F/f = 1.210$

EXAMPLE 6

| SN | $r_i$ | $d_i$ | $n_j$ | $\nu_j$ | $K_i$ | $A_{6i}$ |
|---|---|---|---|---|---|---|
| 1 | 12.472 | 7.237 | 1.49186 | 57.4 | −0.49027 | −8.40087 × 10⁻⁸ |
| 2 | −69.886 | 1.944 | | | −53.6169 | |
| 3 | 30.528 | 1 | 1.80518 | 25.4 | | |
| 4 | 11.288 | | | | | |

Distance from the screen to the first surface: 81.004
Distance from the fourth surface to the eyepoint: 15
Effective finder coverage: 95%
f=65.58
Magnification: 0.793X (52/65.58)

SF1 = −0.697
SF2 = 2.173
$(d_1+d_2+d_3)/f = 0.155$
$f_F/f = 1.235$

EXAMPLE 7

| SN | $r_i$ | $d_i$ | $n_j$ | $\nu_j$ | $K_i$ | $A_{6i}$ |
|---|---|---|---|---|---|---|
| 1 | 16.589 | 5.989 | 1.49186 | 57.4 | −0.88321 | −1.00077 × 10⁻⁷ |
| 2 | −38.051 | 3.144 | | | | |
| 3 | −142.669 | 1 | 1.58547 | 29.9 | | |
| 4 | 18 | | | | | |

Distance from the screen to the first surface: 81.004
Distance from the fourth surface to the eyepoint: 15
Effective finder coverage: 95%
f=70.066
Magnification: 0.742X (52/70.066)

SF1 = −0.393
SF2 = 0.776
$(d_1+d_2+d_3)/f = 0.145$
$f_F/f = 1.156$

EXAMPLE 8

| SN | $r_i$ | $d_i$ | $n_j$ | $\nu_j$ | $K_i$ | $A_{6i}$ |
|---|---|---|---|---|---|---|
| 1 | 15.091 | 6.814 | 1.49186 | 57.4 | | |
| 2 | −24.665 | 1.820 | | | −6.00198 | −8.98476 × 10⁻⁶ |
| 3 | −31.262 | 1 | 1.58547 | 29.9 | | |

-continued

| SN | $r_i$ | $d_i$ | $n_j$ | $v_j$ | $K_i$ | $A_{6i}$ |
|---|---|---|---|---|---|---|
| 4 | 20.510 | | | | | |

Distance from the screen to the first surface: 81.004
Distance from the fourth surface to the eyepoint: 15
Effective finder coverage: 95%
f = 70.273
Magnification: 0.740X (52/70.273)
SF1 = −0.241
SF2 = 0.208
$(d_1+d_2+d_3)/f = 0.137$
$f_F/f = 1.152$

EXAMPLE 9

| SN | $r_i$ | $d_i$ | $n_j$ | $v_j$ | $K_i$ | $A_{6i}$ |
|---|---|---|---|---|---|---|
| 1 | 13.991 | 6.168 | 1.49186 | 57.4 | | |
| 2 | −51.422 | 2.250 | | | | |
| 3 | −86.065 | 1 | 1.58547 | 29.9 | 58.9175 | $-5.27521 \times 10^{-5}$ |
| 4 | 18 | | | | | |

Distance from the screen to the first surface: 81.004
Distance from the fourth surface to the eyepoint: 15
Effective finder coverage: 95%
f = 69.757
Magnification: 0.745X (52/69.757)
SF1 = −0.572
SF2 = 0.654
$(d_1+d_2+d_3)/f = 0.135$
$f_F/f = 1.161$

EXAMPLE 10

| SN | $r_i$ | $d_i$ | $n_j$ | $v_j$ | $K_i$ | $A_{6i}$ |
|---|---|---|---|---|---|---|
| 1 | 12.463 | 6.502 | 1.49186 | 57.4 | | |
| 2 | −73.265 | 1.886 | | | | |
| 3 | −60.334 | 1 | 1.58547 | 29.9 | | |
| 4 | 18.165 | | | | 4.40044 | $-4.80934 \times 10^{-7}$ |

Distance from the screen to the first surface: 81.004
Distance from the fourth surface to the eyepoint: 15
Effective finder coverage: 95%
f = 68.342
Magnification: 0.761X (52/68.342)
SF1 = −0.709
SF2 = 0.537
$(d_1+d_2+d_3)/f = 0.137$
$f_F/f = 1.185$

EXAMPLE 11

| SN | $r_i$ | $d_i$ | $n_j$ | $v_j$ | $K_i$ | $A_{6i}$ | $A_{6i}$ |
|---|---|---|---|---|---|---|---|
| 1 | 12.818 | 8.5 | 1.49186 | 57.4 | 0.22455 | $-5.72694 \times 10^{-6}$ | $-8.00138 \times 10^{-8}$ |
| 2 | 63.022 | 0 | | | | | |
| 3 | 63.022 | 1.5 | 1.58547 | 29.9 | | | |
| 4 | 18 | | | | 4.08541 | | $-2.04666 \times 10^{-7}$ |

Distance from the screen to the first surface: 74.6
Distance from the fourth surface to the eyepoint: 15
Effective finder coverage: 95%
f = 65.211
Magnification: 0.797X (52/65.211)
SF1 = −1.511
SF2 = 1.800
$(d_1+d_2+d_3)/f = 0.153$
$f_F/f = 1.144$

EXAMPLE 12

| SN | $r_i$ | $d_i$ | $n_j$ | $v_j$ | $K_i$ | $A_{6i}$ | $A_{6i}$ |
|---|---|---|---|---|---|---|---|
| 1 | 15.175 | 8.5 | 1.49186 | 57.4 | 0.51174 | $-6.7107 \times 10^{-6}$ | $-4.61234 \times 10^{-8}$ |
| 2 | 737.592 | 0 | | | | | |
| 3 | 737.592 | 1.5 | 1.58547 | 29.9 | | | |
| 4 | 25.562 | | | | 7.51188 | | $-2.60332 \times 10^{-8}$ |

Distance from the screen to the first surface: 74.6
Distance from the fourth surface to the eyepoint: 15
Effective finder coverage: 95%
f = 68.746
Magnification: 0.756X (52/68.746)
SF1 = −1.042
SF2 = 1.072
$(d_1+d_2+d_3)/f = 0.145$
$f_F/f = 1.085$

EXAMPLE 13

| SN | $r_i$ | $d_i$ | $n_j$ | $v_j$ | $K_i$ | $A_{6i}$ |
|---|---|---|---|---|---|---|
| 1 | 19.175 | 5.70 | 1.49186 | 57.4 | −0.781 | $-1.523 \times 10^{-8}$ |
| 2 | −82.5 | 2.10 | | | | |
| 3 | 82.5 | 1.5 | 1.49186 | 57.4 | | |

-continued

| SN | $r_i$ | $d_i$ | $n_j$ | $v_j$ | $K_i$ | $A_{6i}$ |
|----|-------|-------|-------|-------|-------|----------|
| 4  | 18    |       |       |       |       |          |

Figure 14:
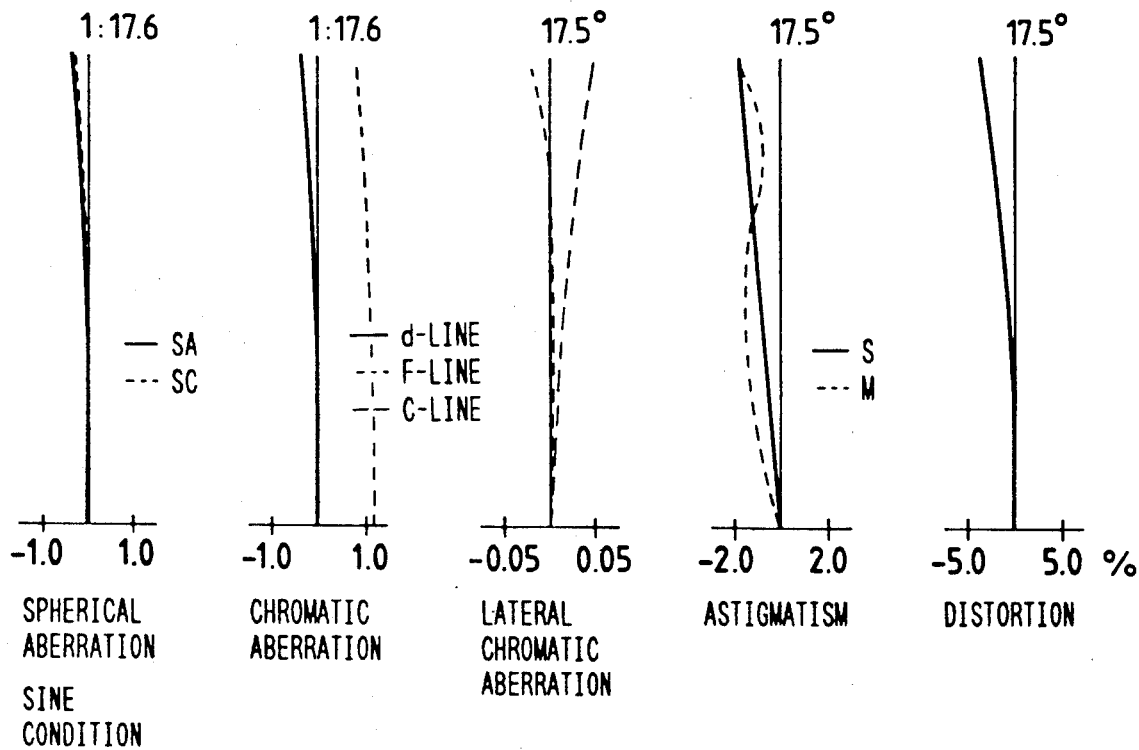
FIGS. 14-26 are graphs plotting the aberration curves obtained with the optical systems of Examples 1-13, respectively, when the eye ring has a diameter of 4.
Figure 14:
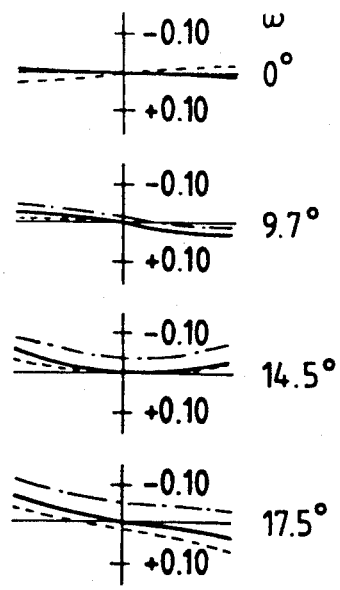
Figure 15:
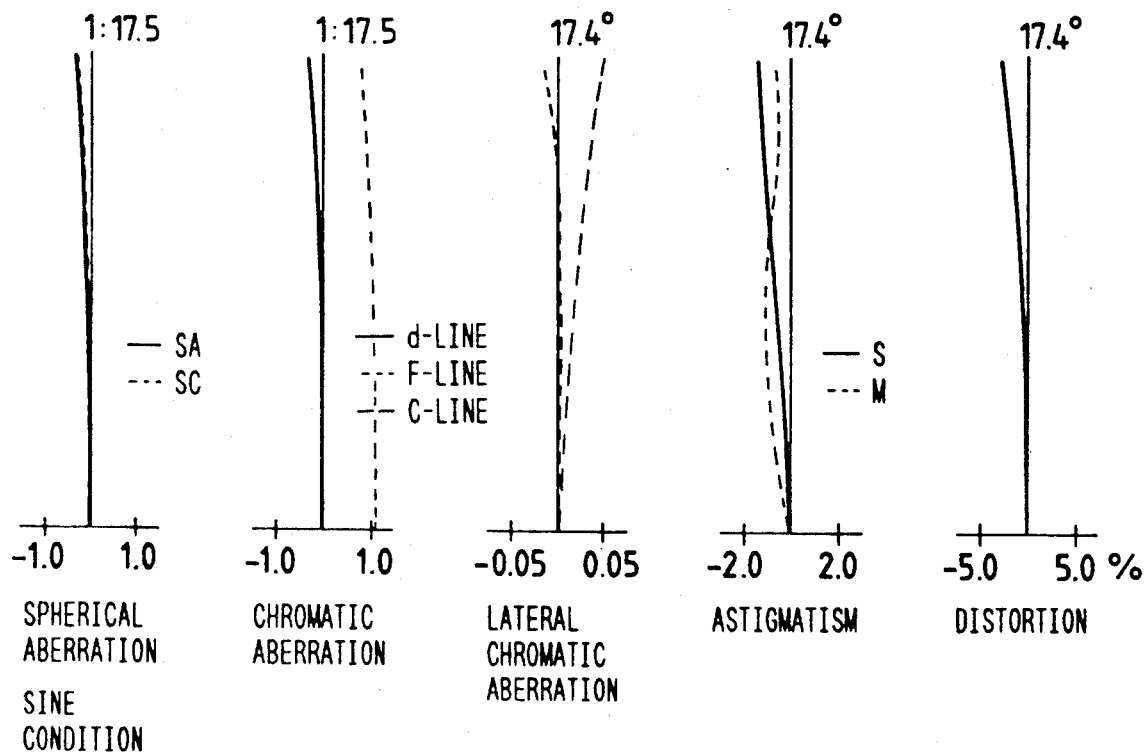
Figure 15:
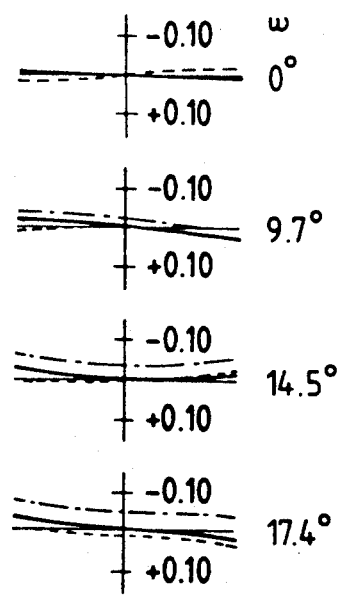
Figure 16:
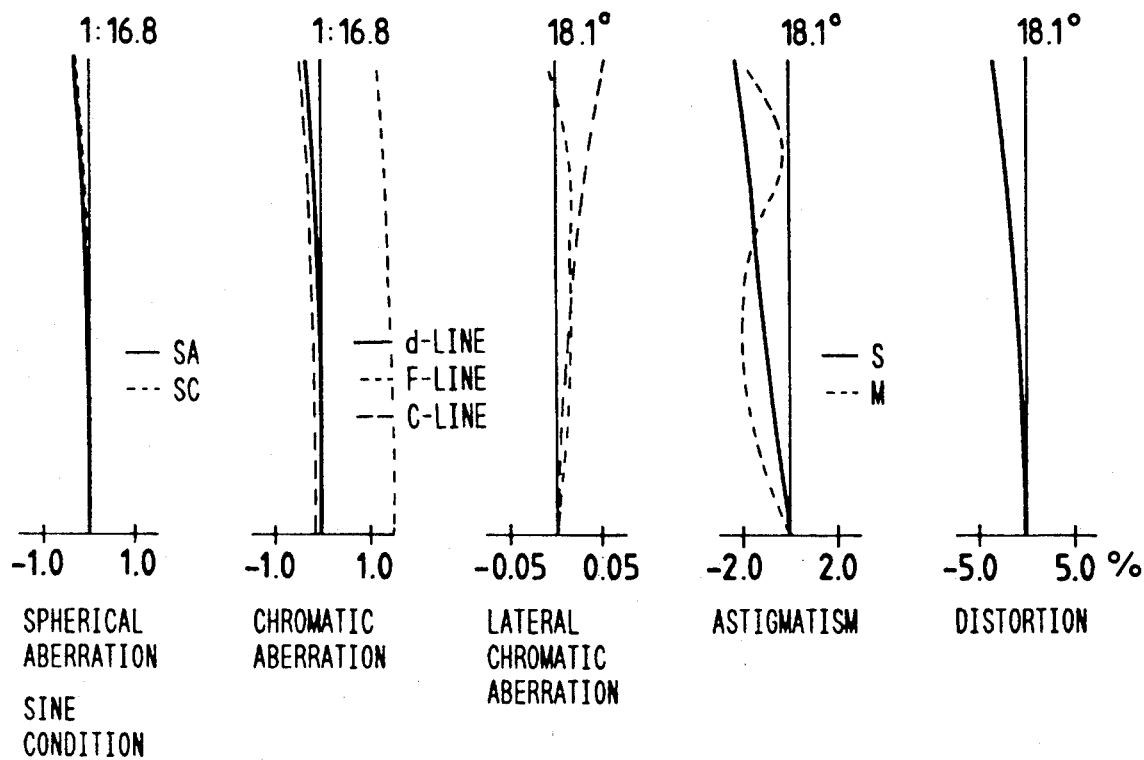
Figure 16:
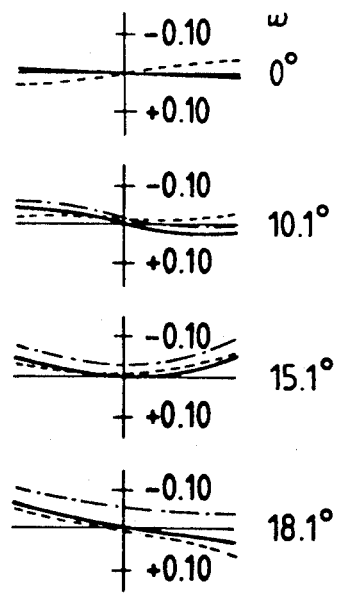
Figure 17:
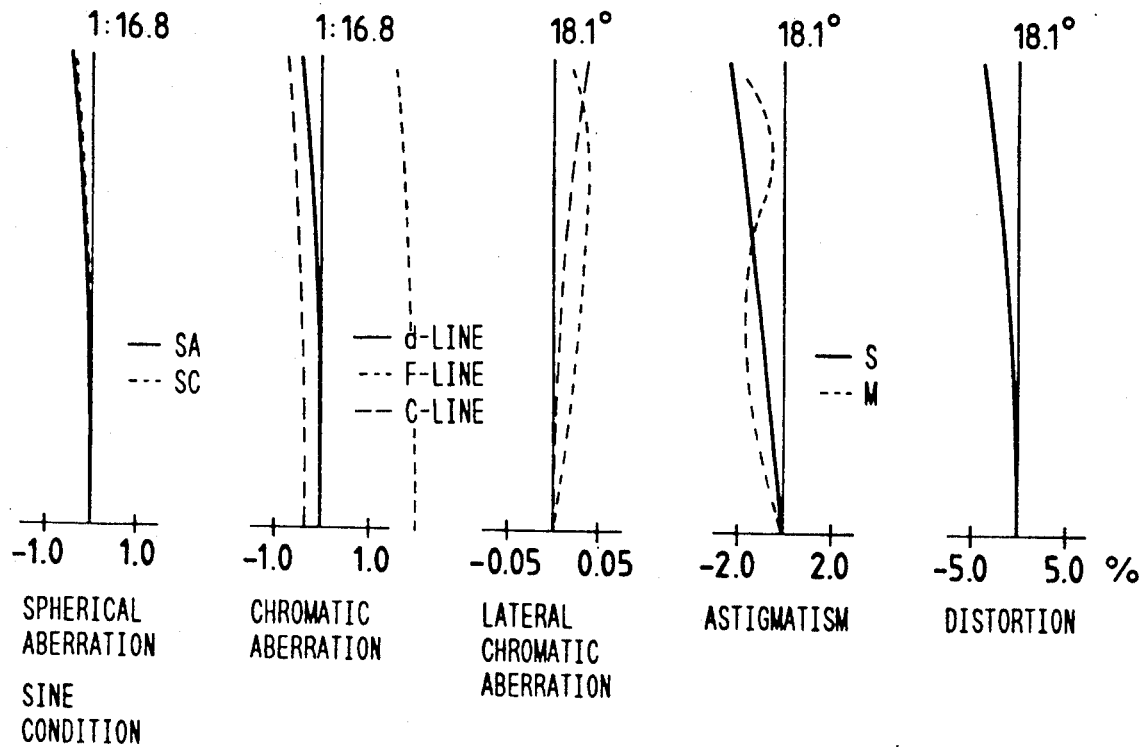
Figure 17:
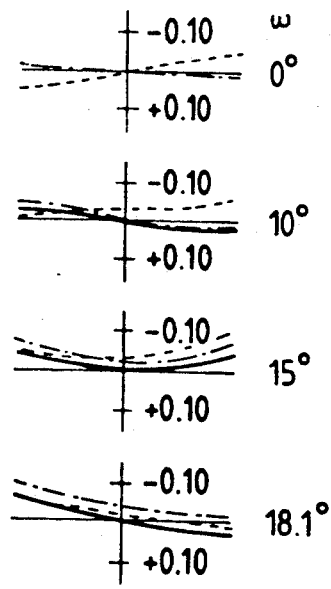
Figure 18:
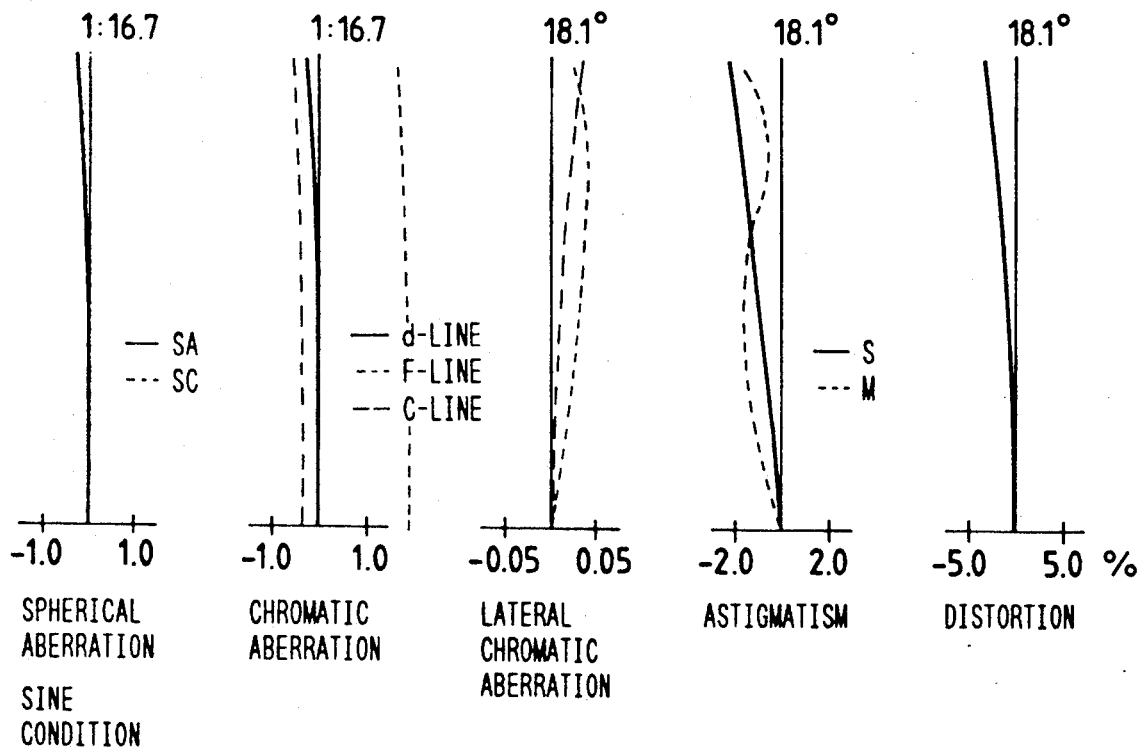
Figure 18:
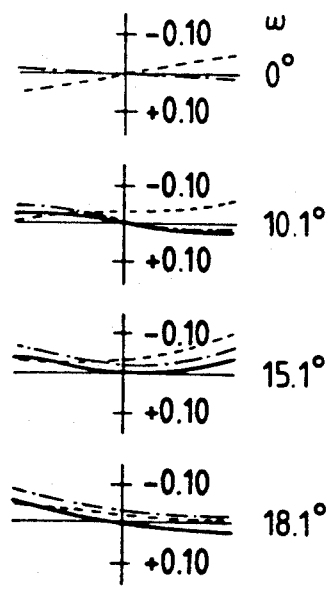
Figure 19:
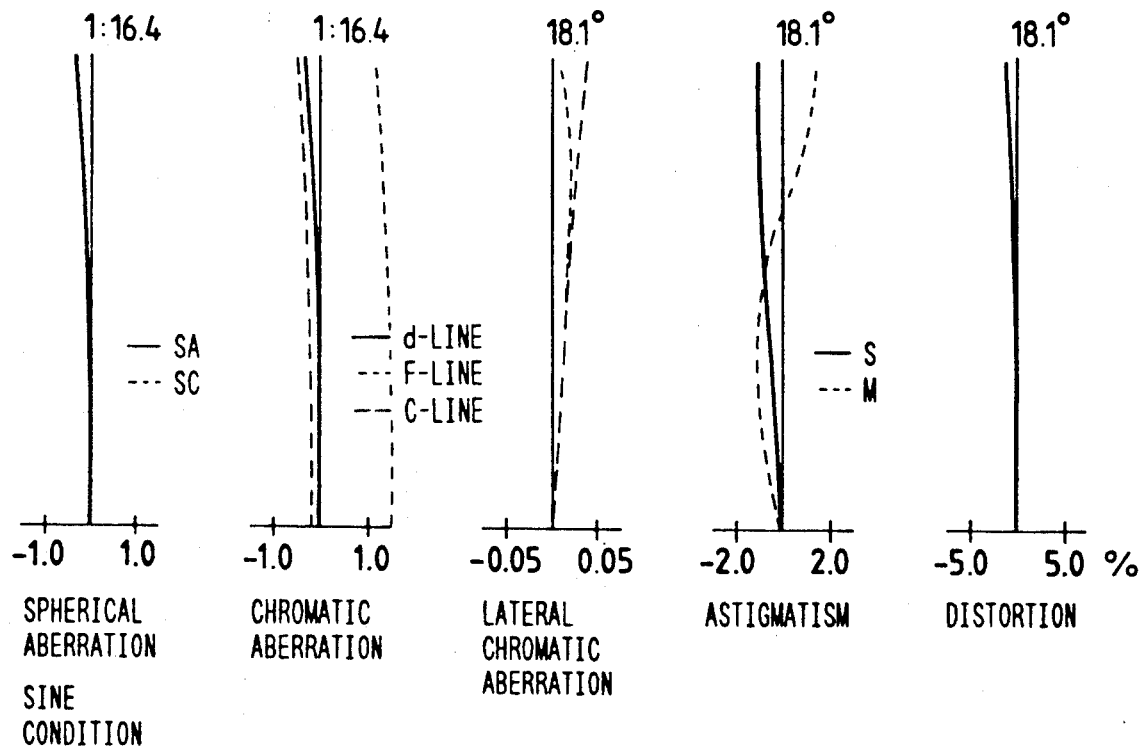
Figure 19:
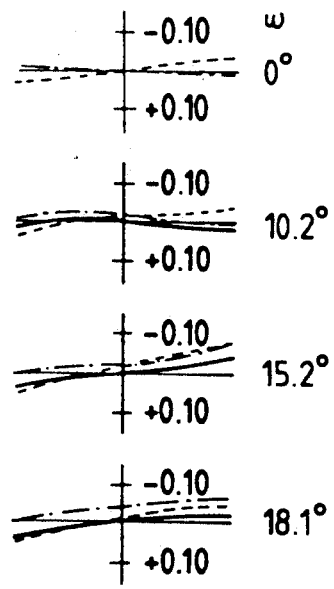
Figure 20:
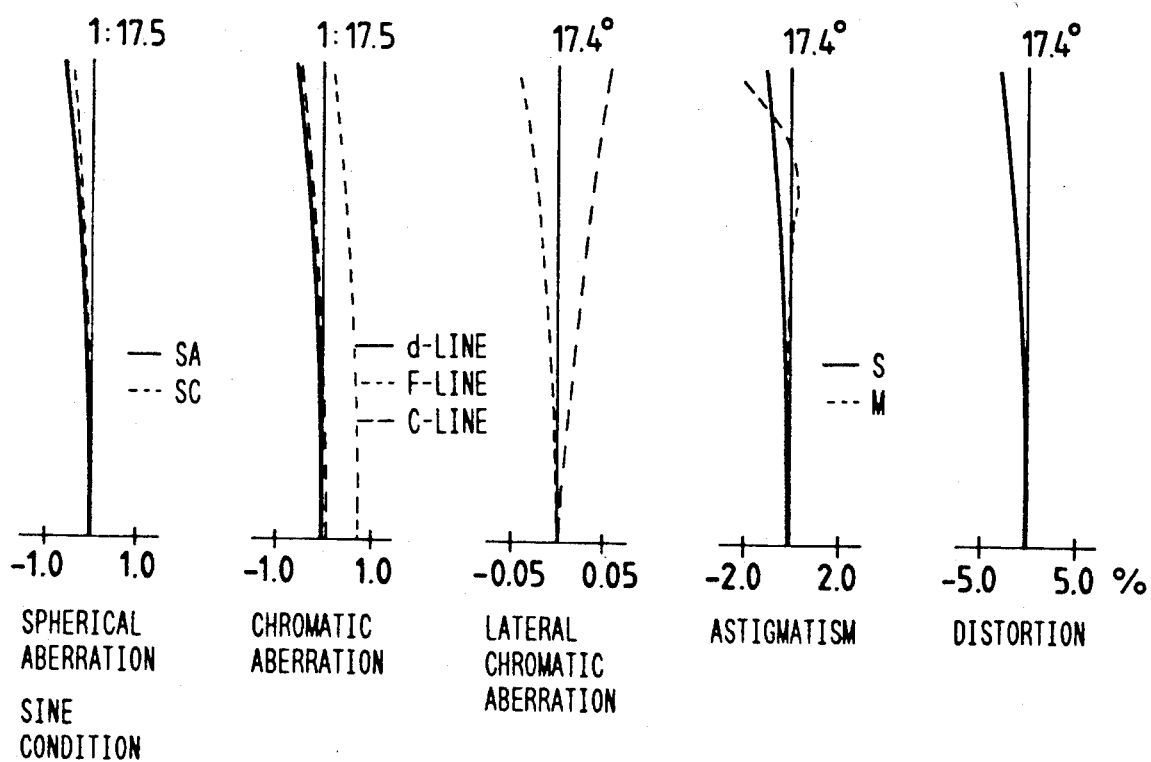
Figure 20:
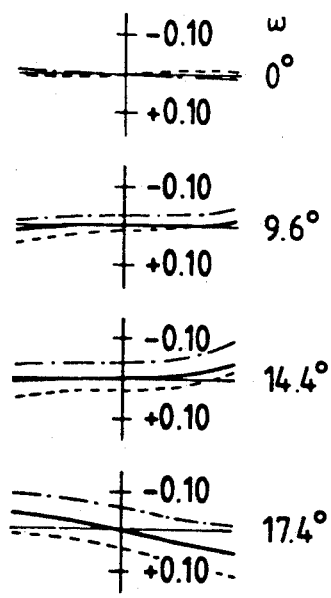
Figure 21:
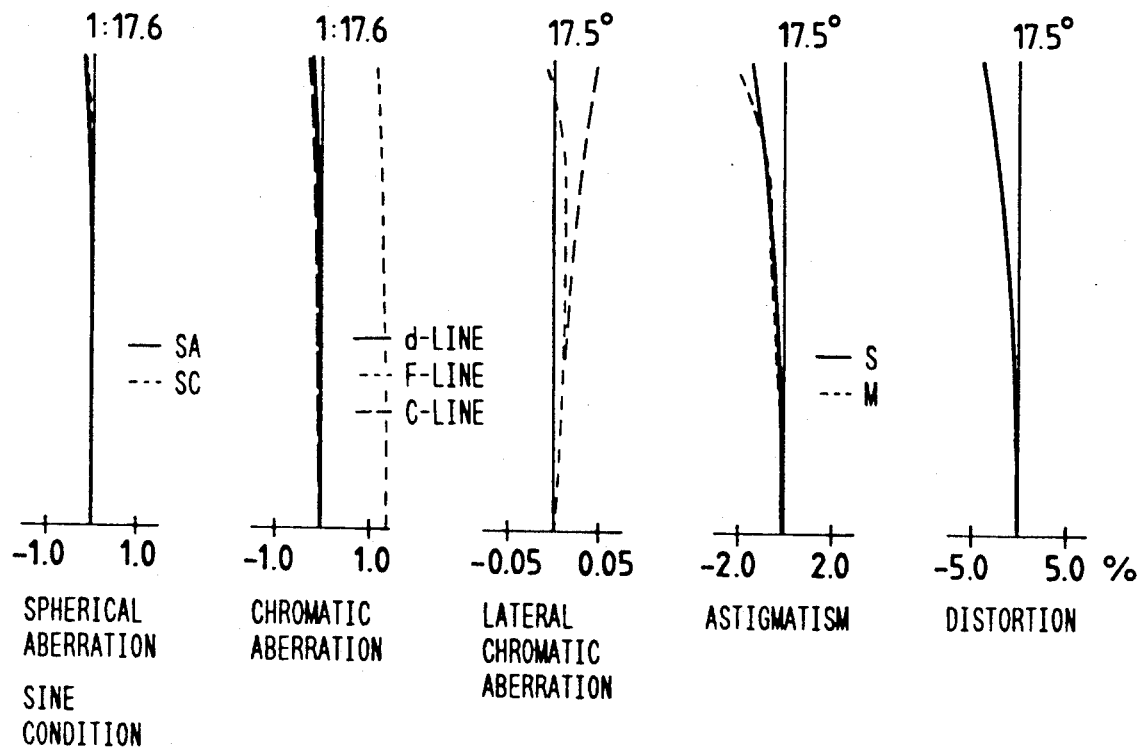
Figure 21:
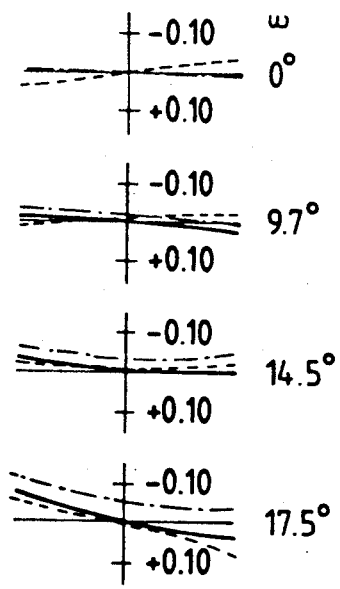
Figure 22:
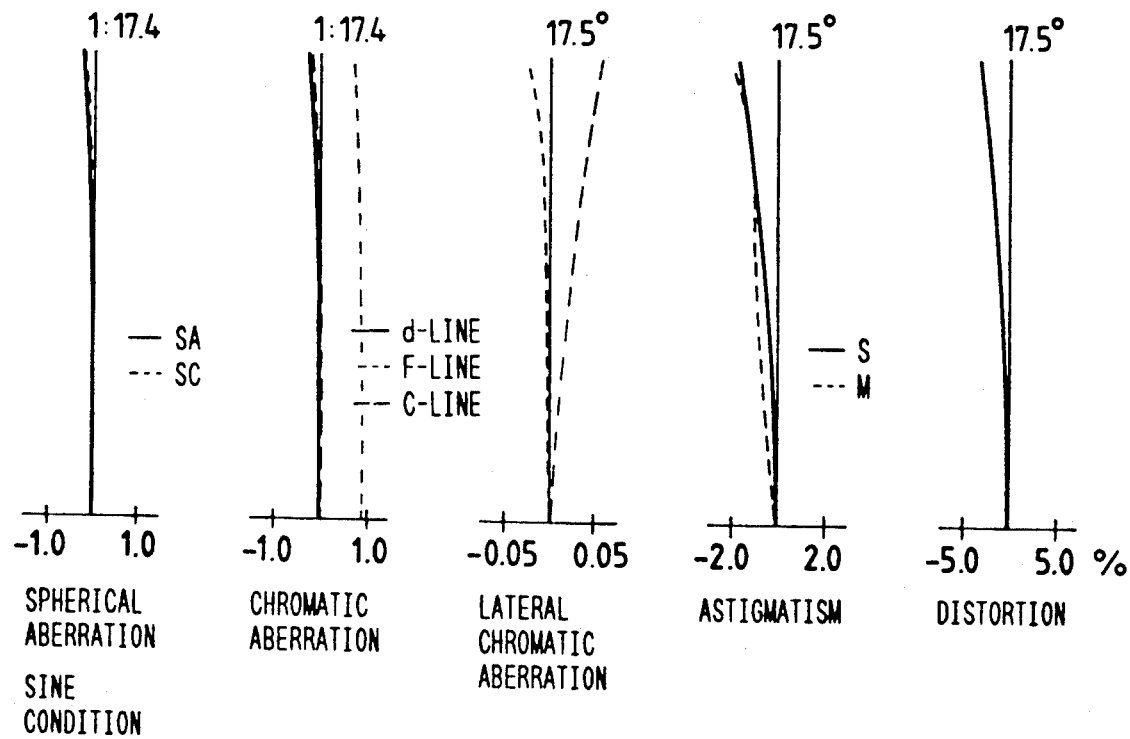
Figure 22:
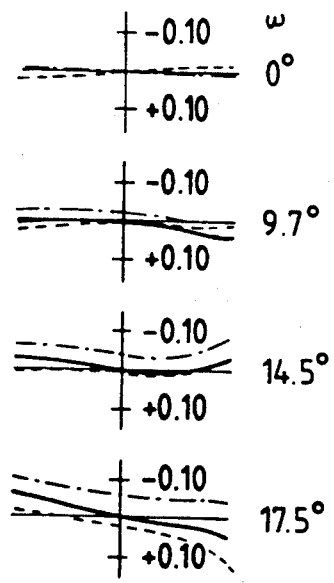
Figure 23:
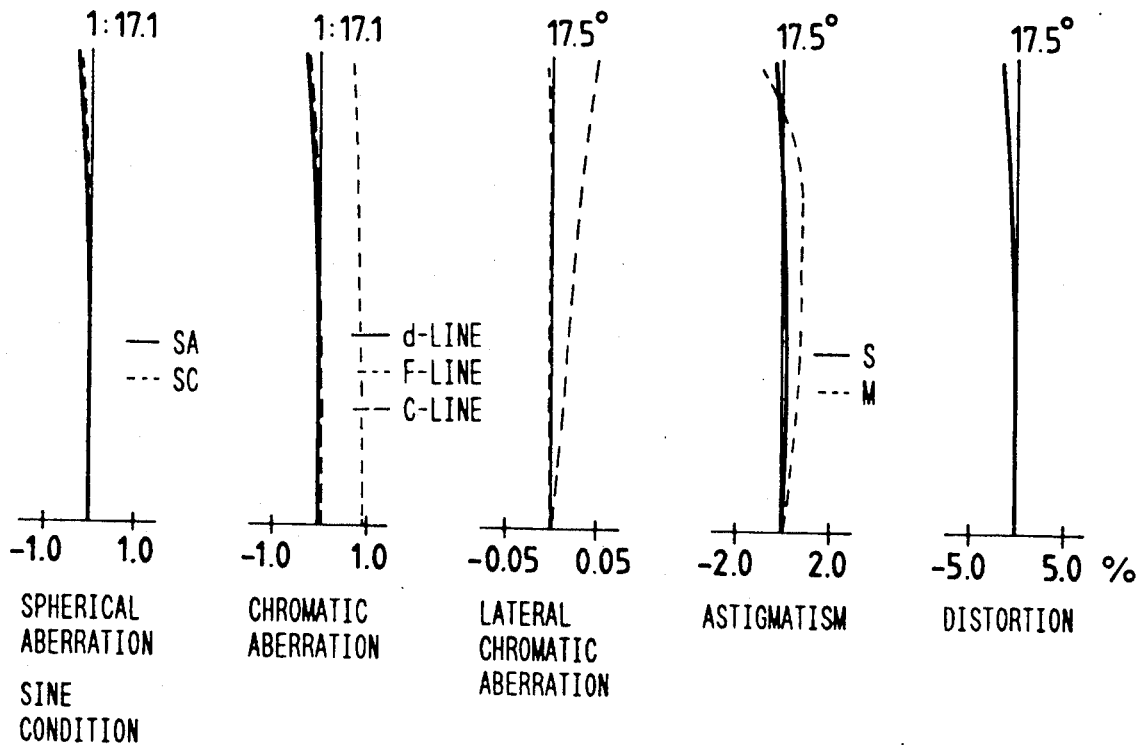
Figure 23:
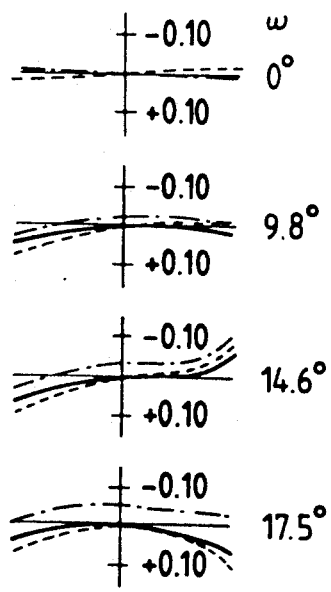
Figure 24:
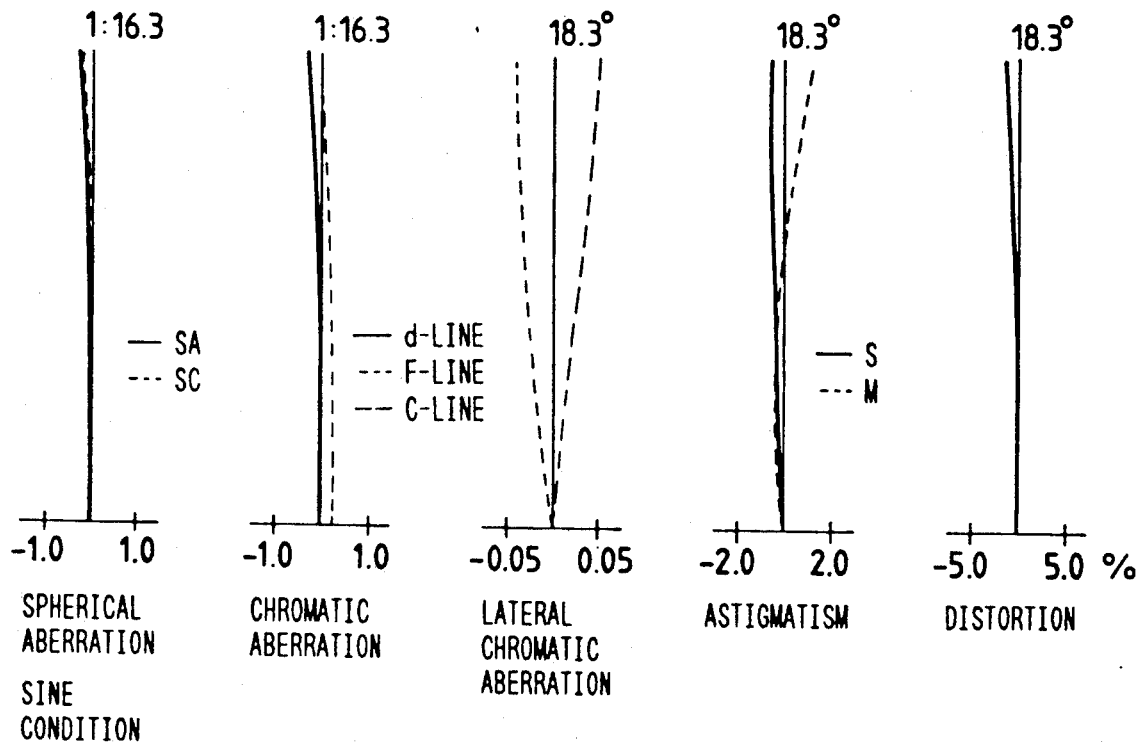
Figure 24:
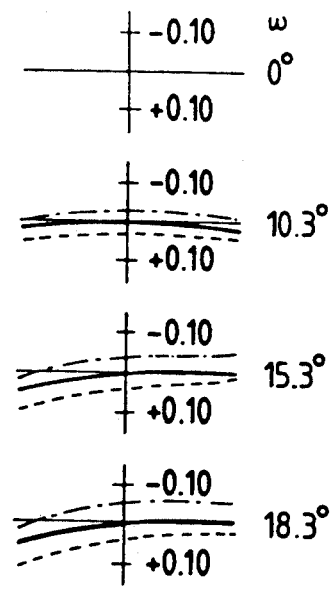
Figure 25:
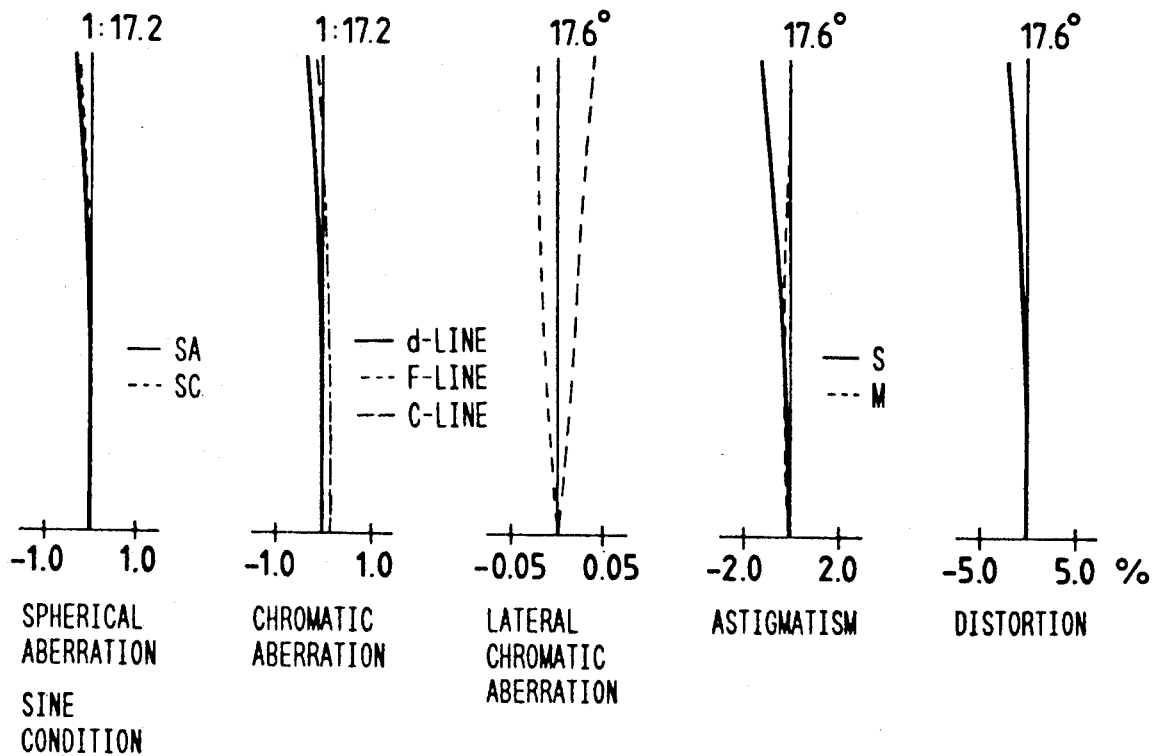
Figure 25:
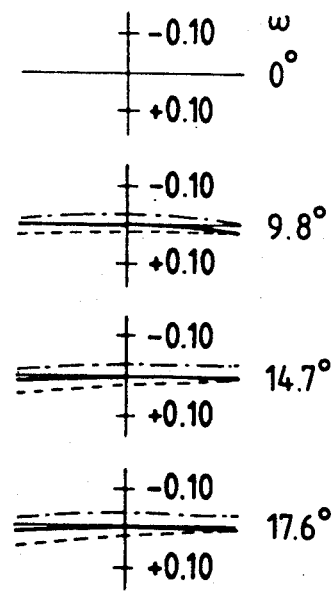
Figure 26:
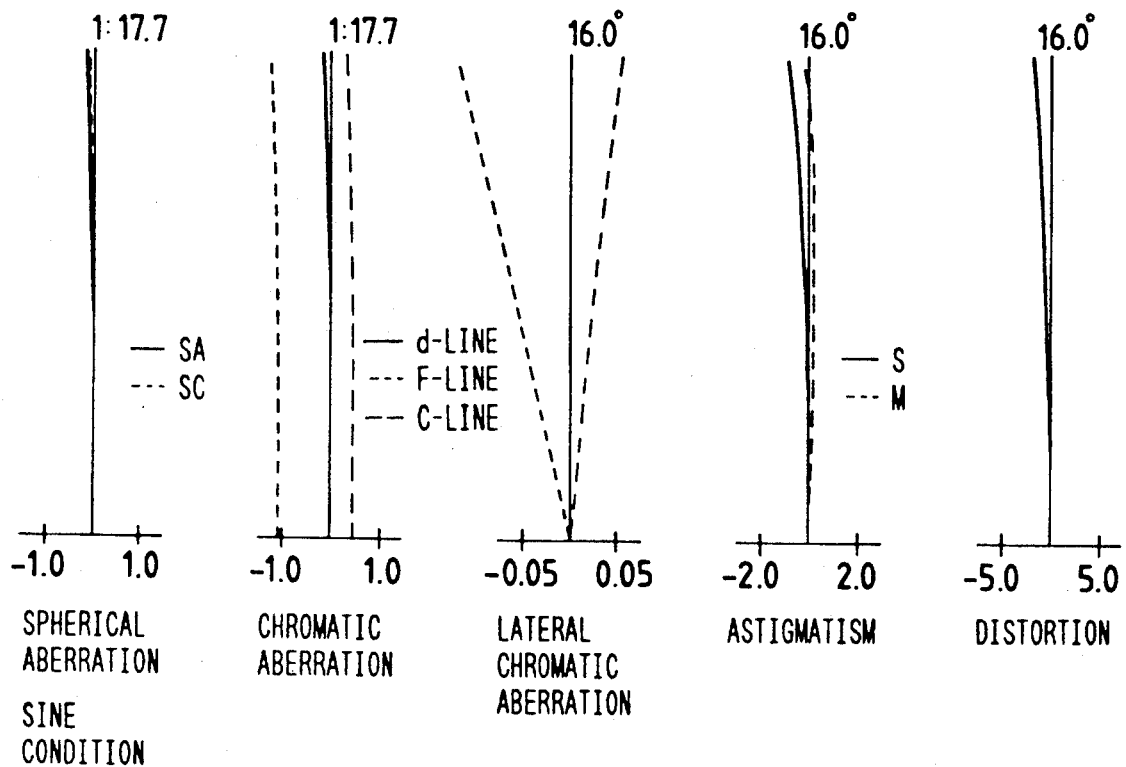
Figure 26:
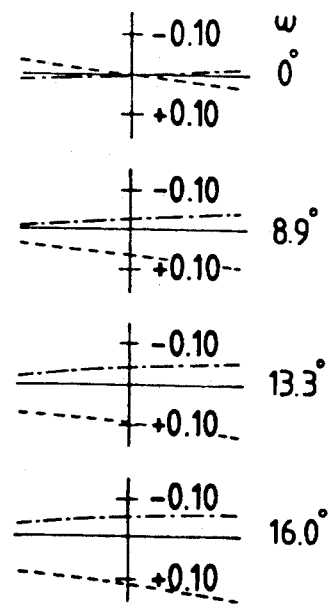

Distance from the screen to the first surface: 75.013
Distance from the fourth surface to the eyepoint: 15
Effective finder coverage: 92%
f = 70.719
Magnification: 0.735X (52/70.719)
SF1 = −0.623
SF2 = 1.558
$(d_1+d_2+d_3)/f = 0.132$
$f_F/f = 1.061$ As described above, the optical system of the present invention adopts a simple two-unit-two-element composition and yet it is capable of achieving higher magnification without using a pentaprism. In spite of its small size, this optical system insures good performance as is clear from the graphs in FIGS. 14–26 which plot the aberration curves obtained with this system. If both the first and second lenses are made of resins, the additional advantage of very low cost is attained.

What is claimed is:

1. An optical system for use with a viewfinder in a single-lens reflex camera, which optical system has a finder screen side and an eyepoint side and comprises, in order from the finder screen side, a first lens unit comprising a positive lens element and a second lens unit comprising a negative lens element, said optical system satisfying the following conditions:

$$-2 < SF1 < 0 \quad (1)$$

$$0 < SF2 < 3 \quad (2)$$

where SF1 is the shape factor of the first lens unit, SF2 is the shape factor of the second lens unit and with the shape factor of each lens unit being defined by:

$$SF = \frac{R_S + R_E}{R_S - R_E}$$

where $R_S$ is the radius of curvature of the surface of each lens unit on the finder screen side, and $R_E$ is the radius of curvature of the surface of each lens unit on the eyepoint side.

2. An optical system according to claim 1 wherein at least one of the four surfaces delineating said first and second lens units is aspheric.

3. An optical system according to claim 2, wherein said aspheric surface is of a shape expressed by:

$$X = \frac{Y^2/R}{1 + \sqrt{1 - (K + 1) Y^2/R^2}} + \sum_{m=2}^{5} A_{2m} \cdot Y^{2k}$$

where X is the distance measured from the apex along the optical axis in the direction in which rays travel, Y is the height from the optical axis, R is the radius of curvature of a reference spherical plane, K is the shape factor of a rotating quadratic curved plane, and $A_{2m}$ is the asphericity coefficient of a higher degree.

4. An optical system according to claim 1, which further satisfies the condition:

$$0.05 < (d_1+d_2+d_3)/f < 0.3$$

where $d_1$ is the thickness of said first lens unit in the direction of an optical axis of said system, $d_2$ is the distance between said first and second lens units on the optical axis, $d_3$ is the thickness of said second lens unit in the direction of said optical axis, and f is the composite focal length of the optical system.

5. An optical system according to claim 2, which further satisfies the condition:

$$0.05 < (d_1+d_2+d_3)/f < 0.3$$

where $d_1$ is the thickness of said first lens unit in the direction of an optical axis of said system, $d_2$ is the distance between said first and second lens units on the optical axis, $d_3$ is the thickness of said second lens unit in the direction of said optical axis, and f is the composite focal length of the optical system.

6. An optical system according to claim 1, wherein said first lens is made of an acrylic resin and said second lens made of a polycarbonate resin.

7. An optical system according to claim 1, wherein said first lens unit consists of said first lens element and said second lens unit consists of said second lens element.

8. An optical system according to claim 1, which further satisfies the condition:

$$1.0 < f_F/f < 1.3$$

where $f_F$ is the distance from the finder screen to the first lens surface of the first lens unit, and f is the composite focal length of the optical system.

9. An optical system according to claim 2, which further satisfies the condition:

$$1.0 < f_1/f < 1.3$$

where $f_F$ is the distance from the finder screen to the first lens surface of the first lens unit, and f is the composite focal length of the optical system.

10. An optical system according to claim 1, wherein said first and second lens units are cemented together.

11. An optical system according to claim 2, wherein said first and second lens units are cemented together.

12. An optical system according to claim 1, satisfying the following data table, in which SN denotes a surface number starting from the finder screen side, $r_i$ denotes a radius of curvature (in millimeters) of the ith surface, $d_i$ denotes a distance (in millimeters) between the ith and (i+1)th surfaces, $n_j$ denotes a refractive index of the jth lens (optical material) at the d-line, $v_j$ denotes an Abbe number of the jth lens (optical material), $K_i$ denotes a shape factor of a rotating quadratic curved plane for the ith surface, and $A_{6i}$ denotes a triquadratic asphericity coefficient of the ith surface, and wherein the distance from the fourth surface to the eyepoint is 15 mm, the effective finder coverage is 95% and the distance from the finder screen to the first surface is 81.004 mm:

| SN | $r_i$ | $d_i$ | $n_j$ | $v_j$ | $K_i$ | $A_{6i}$ |
|---|---|---|---|---|---|---|
| 1 | 15.534 | 6.476 | 1.49186 | 57.4 | −0.23684 | −7.74061 × 10$^{-8}$ |
| 2 | −28.357 | 2.154 | | | −7.37018 | |
| 3 | −53.238 | 1 | 1.58547 | 29.9 | | |
| 4 | 18 | | | | | |

Distance from the screen to the first surface: 81.004
Distance from the fourth surface to the eyepoint: 15
Effective finder voverage: 95%
f = 70.229
Magnification: 0.740X (52/70.229)
SF1 = −0.292
SF2 = 0.495
$(d_1+d_2+d_3)/f = 0.137$
$f_F/f = 1.153$ 13. An optical system according to claim 1, satisfying the following data table, in which SN denotes a surface number starting from the finder screen side, $r_i$ denotes a radius of curvature (in millimeters) of the ith surface, $d_i$ denotes a distance (in millimeters) between the ith and (i+1)th surfaces, $n_j$ denotes a refractive index of the jth lens (optical material) at the d-line, $v_j$ denotes an Abbe number of the jth lens (optical material), $K_i$ denotes a shape factor of a rotating quadratic curved plane for the ith surface, and $A_{6i}$ denotes a triquadratic asphericity coefficient of the ith surface, and wherein the distance from the fourth surface to the eyepoint is 15 mm, the effective finder coverage is 95% and the distance from the finder screen to the first surface is 81.004 mm:

| SN | $r_i$ | $d_i$ | $n_j$ | $v_j$ | $K_i$ | $A_{6i}$ |
|---|---|---|---|---|---|---|
| 1 | 14.489 | 6.224 | 1.49186 | 57.4 | −0.34447 | −7.28882 × 10$^{-8}$ |
| 2 | −34.501 | 2.005 | | | −11.6694 | |
| 3 | −146.305 | 1 | 1.58547 | 29.9 | | |
| 4 | 15 | | | | | |

Distance from the screen to the first surface: 81.004
Distance from the fourth surface to the eyepoint: 15
Effective finder coverage: 95%
f = 69.961
Magnification: 0.743X (52/69.961)
SF1 = −0.408
SF2 = 0.814
$(d_1+d_2+d_3)/f = 0.132$
$f_F/f = 1.158$ 14. An optical system according to claim 1, satisfying the following data table, in which SN denotes a surface number starting from the finder screen side, $r_i$ denotes a radius of curvature (in millimeters) of the ith surface, $d_i$ denotes a distance (in millimeters) between the ith and (i+1)th surfaces, $n_j$ denotes a refractive index of the jth lens (optical material) at the d-line, $v_j$ denotes an Abbe number of the jth lens (optical material), $K_i$ denotes a shape factor of a rotating quadratic curved plane for the ith surface, and $A_{6i}$ denotes a triquadratic asphericity coefficient of the ith surface, and wherein the distance from the fourth surface to the eyepoint is 15 mm, the effective finder coverage is 95% and the distance from the finder screen to the first surface is 81.004 mm:

| SN | $r_i$ | $d_i$ | $n_j$ | $v_j$ | $K_i$ | $A_{6i}$ |
|---|---|---|---|---|---|---|
| 1 | 13.231 | 8.203 | 1.49186 | 57.4 | −0.275 | −1.30316 × 10$^{-7}$ |
| 2 | −24.387 | 1.231 | | | −9.80573 | 2.4702 × 10$^{-8}$ |
| 3 | −110.535 | 1 | 1.71736 | 29.3 | | |
| 4 | 15 | | | | | |

Distance from the screen to the first surface: 81.004
Distance from the fourth surface to the eyepoint: 15
Effective finder coverage: 95%
f = 67.03
Magnification: 0.776X (52/67.03)
SF1 = −0.297
SF2 = 0.761
$(d_1+d_2+d_3)/f = 0.156$
$f_F/f = 1.208$ 15. An optical system according to claim 1, satisfying the following data table, in which SN denotes a surface number starting from the finder screen side, $r_i$ denotes a radius of curvature (in millimeters) of the ith surface, $d_i$ denotes a distance (in millimeters) between the ith and (i+1)th surfaces, $n_j$ denotes a refractive index of the jth lens (optical material) at the d-line, $v_j$ denotes an Abbe number of the jth lens (optical material), $K_i$ denotes a shape factor of a rotating quadratic curved plane for the ith surface, and $A_{6i}$ denotes a triquadratic asphericity coefficient of the ith surface, and wherein the distance from the fourth surface to the eyepoint is 15 mm, the effective finder coverage is 95% and the distance from the finder screen to the first surface is 81.004 mm:

| SN | $r_i$ | $d_i$ | $n_j$ | $v_j$ | $K_i$ | $A_{6i}$ |
|---|---|---|---|---|---|---|
| 1 | 14.678 | 7.6 | 1.49186 | 57.4 | −0.38849 | −9.08487 × 10$^{-8}$ |
| 2 | −28.267 | 2.153 | | | −9.04108 | |
| 3 | −333.815 | 1 | 1.80518 | 25.4 | | |
| 4 | 18 | | | | | |

Distance from the screen to the first surface: 81.004
Distance from the fourth surface to the eyepoint: 15
Effective finder coverage: 95%
f = 67.314
Magnification: 0.772X (52/67.314)
SF1 = −0.316

SF2=0.898
$(d_1+d_2+d_3)/f=0.160$
$f_F/f=1.203$

16. An optical system according to claim 1, satisfying the following data table, in which SN denotes a surface number starting from the finder screen side, $r_i$ denotes a radius of curvature (in millimeters) of the ith surface, $d_i$ denotes a distance (in millimeters) between the ith and (i+1)th surfaces, $n_j$ denotes a refractive index of the jth lens (optical material) at the d-line, $v_j$ denotes an Abbe number of the jth lens (optical material), $K_i$ denotes a shape factor of a rotating quadratic curved plane for the ith surface, and $A_{6i}$ denotes a triquadratic asphericity coefficient of the ith surface, and wherein the distance from the fourth surface to the eyepoint is 15 mm, the effective finder coverage is 95% and the distance from the finder screen to the first surface is 81.004 mm:

| SN | $r_i$ | $d_i$ | $n_j$ | $v_j$ | $K_i$ | $A_{6i}$ |
|---|---|---|---|---|---|---|
| 1 | 13.944 | 7.548 | 1.49186 | 57.4 | −0.43628 | −9.28391 × 10$^{-8}$ |
| 2 | −31.306 | 1.94 | | | −12.3174 | |
| 3 | 136.934 | 1 | 1.80518 | 25.4 | | |
| 4 | 15 | | | | | |

Distance from the screen to the first surface: 81.004
Distance from the fourth surface to the eyepoint: 15
Effective finder coverage: 95% f=66.927
Magnification: 0.777X (52/66.927)
SF1=−0.384
SF2=1.2461
$(d_1+d_2+d_3)/f=0.157$
$f_F/f=1.210$ 17. An optical system according to claim 1, satisfying the following data table, in which SN denotes a surface number starting from the finder screen side, $r_i$ denotes a radius of curvature (in millimeters) of the ith surface, $d_i$ denotes a distance (in millimeters) between the ith and (i+1)th surfaces, $n_j$ denotes a refractive index of the jth lens (optical material) at the d-line, $v_j$ denotes an Abbe number of the jth lens (optical material), $K_i$ denotes a shape factor of a rotating quadratic curved plane for the ith surface, and $A_{6i}$ denotes a triquadratic asphericity coefficient of the ith surface, and wherein the distance from the fourth surface to the eyepoint is 15 mm, the effective finder coverage is 95% and the distance from the finder screen to the first surface is 81.004 mm:

| SN | $r_i$ | $d_i$ | $n_j$ | $v_j$ | $K_i$ | $A_{6i}$ |
|---|---|---|---|---|---|---|
| 1 | 12.472 | 7.237 | 1.49186 | 57.4 | −0.49027 | −8.40087 × 10$^{-8}$ |
| 2 | −69.886 | 1.944 | | | −53.6169 | |
| 3 | 30.528 | 1 | 1.80518 | 25.4 | | |
| 4 | 11.288 | | | | | |

Distance from the screen to the first surface: 81.004
Distance from the fourth surface to the eyepoint: 15
Effective finder coverage: 95% f=65.58
Magnification: 0.793X (52/65.58)
SF1=−0.697
SF2=2.173
$(d_1+d_2+d_2)/f=0.155$
$f_F/f=1.235$ 18. An optical system according to claim 1, satisfying the following data table, in which SN denotes a surface number starting from the finder screen side, $r_i$ denotes a radius of curvature (in millimeters) of the ith surface, $d_i$ denotes a distance (in millimeters) between the ith and (i+1)th surfaces, $n_j$ denotes a refractive index of the jth lens (optical material) at the d-line, $v_j$ denotes an Abbe number of the jth lens (optical material), $K_i$ denotes a shape factor of a rotating quadratic curved plane for the ith surface, and $A_{6i}$ denotes a triquadratic asphericity coefficient of the ith surface, and wherein the distance from the fourth surface to the eyepoint is 15 mm, the effective finder coverage is 95% and the distance from the finder screen to the first surface is 81.004 mm:

| SN | $r_i$ | $d_i$ | $n_j$ | $v_j$ | $K_i$ | $A_{6i}$ |
|---|---|---|---|---|---|---|
| 1 | 16.589 | 5.989 | 1.49186 | 57.4 | −0.88321 | −1.00077 × 10$^{-7}$ |
| 2 | −38.051 | 3.144 | | | | |
| 3 | −142.669 | 1 | 1.58547 | 29.9 | | |
| 4 | 18 | | | | | |

Distance from the screen to the first surface: 81.004
Distance from the fourth surface to the eyepoint: 15
Effective finder coverage: 95%
f=70.066
Magnification: 0.742X (52/70.066)
SF1=−0.393
SF2=0.776
$(d_1+d_2+d_3)/f=0.145$
$f_F/f=1.156$ 19. An optical system according to claim 1, satisfying the following data table, in which SN denotes a surface number starting from the finder screen side, $r_i$ denotes a radius of curvature (in millimeters) of the ith surface, $d_i$ denotes a distance (in millimeters) between the ith and (i+1)th surfaces, $n_j$ denotes a refractive index of the jth lens (optical material) at the d-line, $v_j$ denotes an Abbe number of the jth lens (optical material), $K_i$ denotes a shape factor of a rotating quadratic curved plane for the ith surface, and $A_{4i}$ denotes a biquadratic asphericity coefficient of the ith surface and wherein the distance from the fourth surface to the eyepoint is 15 mm, the effective finder coverage is 95% and the distance from the finder screen to the first surface is 81.004 mm:

| SN | $r_i$ | $d_i$ | $n_j$ | $v_j$ | $K_i$ | $A_{6i}$ |
|---|---|---|---|---|---|---|
| 1 | 15.091 | 6.814 | 1.49186 | 57.4 | | |
| 2 | −24.665 | 1.820 | | | −6.00198 | $-8.98476 \times 10^{-6}$ |
| 3 | −31.262 | 1 | 1.58547 | 29.9 | | |
| 4 | 20.510 | | | | | |

Distance from the screen to the first surface: 81.004
Distance from the fourth surface to the eyepoint: 15
Effective finder coverage: 95%
f = 70.273
Magnification: 0.740X (52/70.273)
SF1 = −0.241
SF2 = 0.208
$(d_1+d_2+d_3)/f = 0.137$
$f_F/f = 1.152$ 20. An optical system according to claim 1, satisfying the following data table, in which SN denotes a surface number starting from the finder screen side, $r_i$ denotes a radius of curvature (in millimeters) of the ith surface, $d_i$ denotes a distance (in millimeters) between the ith and (i+1)th surfaces, $n_j$ denotes a refractive index of the jth lens (optical material) at the d-line, $v_j$ denotes an Abbe number of the jth lens (optical material), $K_i$ denotes a shape factor of a rotating quadratic curved plane for the ith surface, and $A_{4i}$ denotes a biquadratic asphericity coefficient of the ith surface, and wherein the distance from the fourth surface to the eyepoint is 15 mm, the effective finder coverage is 95% and the distance from the finder screen to the first surface is 81.004 mm:

| SN | $r_i$ | $d_i$ | $n_j$ | $v_j$ | $K_i$ | $A_{6i}$ |
|---|---|---|---|---|---|---|
| 1 | 13.991 | 6.168 | 1.49186 | 57.4 | | |
| 2 | −51.422 | 2.250 | | | | |
| 3 | −86.065 | 1 | 1.58547 | 29.9 | 58.9175 | $-5.27521 \times 10^{-5}$ |
| 4 | 18 | | | | | |

Distance from the screen to the first surface: 81.004
Distance from the fourth surface to the eyepoint: 15
Effective finder coverage: 95%
f = 69.757
Magnification: 0.745X (52/69.757)
SF1 = −0.572
SF2 = 0.654
$(d_1+d_2+d_3)/f = 0.135$
$f_F/f = 1.161$ 21. An optical system according to claim 1, satisfying the following data table, in which SN denotes a surface number starting from the finder screen side, $r_i$ denotes a radius of curvature (in millimeters) of the ith surface, $d_i$ denotes a distance (in millimeters) between the ith and (i+1)th surfaces, $n_j$ denotes a refractive index of the jth lens (optical material) at the d-line, $v_j$ denotes an Abbe number of the jth lens (optical material), $K_i$ denotes a shape factor of a rotating quadratic curved plane for the ith surface, and $A_{6i}$ denotes a triquadratic asphericity coefficient of the ith surface, and wherein the distance from the fourth surface to the eyepoint is 15 mm, the effective finder coverage is 95% and the distance from the finder screen to the first surface is 81 004 mm:

| SN | $r_i$ | $d_i$ | $n_j$ | $v_j$ | $K_i$ | $A_{6i}$ |
|---|---|---|---|---|---|---|
| 1 | 12.463 | 6.502 | 1.49186 | 57.4 | | |
| 2 | −73.265 | 1.886 | | | | |
| 3 | −60.334 | 1 | 1.58547 | 29.9 | | |
| 4 | 18.165 | | | | 4.40044 | $-4.80934 \times 10^{-7}$ |

Distance from the screen to the first surface: 81.004
Distance from the fourth surface to the eyepoint: 15
Effective finder coverage: 95%
f = 68.342
Magnification: 0.761X (52/68.342)
SF1 = −0.709
SF2 = 0.537
$(d_1+d_2+d_3)/f = 0.137$
$f_F/f = 1.185$ 22. An optical system according to claim 1, satisfying the following data table, in which SN denotes a surface number starting from the finder screen side, $r_i$ denotes a radius of curvature (in millimeters) of the ith surface, $d_i$ denotes a distance (in millimeters) between the ith and (i+1)th surfaces, $n_j$ denotes a refractive index of the jth lens (optical material) at the d-line, $v_j$ denotes an Abbe number of the jth lens (optical material), $K_i$ denotes a shape factor of a rotating quadratic curved plane for the ith surface, $A_{4i}$ denotes a biquadratic asphericity coefficient of the ith surface, and $A_{6i}$ denotes a triquadratic asphericity coefficient of the ith surface, and wherein the distance from the fourth surface to the eyepoint is 15 mm, the effective finder coverage is 95% and the distance from the finder screen to the first surface is 74.6 mm:

| SN | $r_i$ | $d_i$ | $n_j$ | $v_j$ | $K_i$ | $A_{4i}$ | $A_{6i}$ |
|---|---|---|---|---|---|---|---|
| 1 | 12.818 | 8.5 | 1.49186 | 57.4 | 0.22455 | $-5.72694 \times 10^{-6}$ | $-8.00138 \times 10^{-8}$ |
| 2 | 63.022 | 0 | | | | | |
| 3 | 63.022 | 1.5 | 1.58547 | 29.9 | | | |
| 4 | 18 | | | | 4.08541 | | $-2.04666 \times 10^{-7}$ |

Distance from the screen to the first surface: 74.6
Distance from the fourth surface to the eyepoint: 15
Effective finder coverage: 95%
f = 65.211

Magnification: 0.797X (52/65.211)
SF1 = −1.511
SF2 = 1.800
$(d_1+d_2+d_3)/f = 0.153$
$f_F/f = 1.144$ 23. An optical system according to claim 1, satisfying the following data table, in which SN denotes a surface number starting from the finder screen side, $r_i$ denotes a radius of curvature (in millimeters) of the ith surface, $d_i$ denotes a distance (in millimeters) between the ith and (i+1)th surfaces, $n_j$ denotes a refractive index of the jth lens (optical material) at the d-line, $v_j$ denotes an Abbe number of the jth lens (optical material), $K_i$ denotes a shape factor of a rotating quadratic curved plane for the ith surface, $A_{4i}$ denotes a biquadratic asphericity coefficient of the ith surface, and denotes a triquadratic asphericity coefficient of the ith surface, and wherein the distance from the fourth surface to the eyepoint is 15 mm, the effective finder coverage is 95% and the distance from the finder screen to the first surface is 74.6 mm:

| SN | $r_i$ | $d_i$ | $n_j$ | $v_j$ | $K_i$ | $A_{6i}$ | $A_{6i}$ |
|---|---|---|---|---|---|---|---|
| 1 | 15.175 | 8.5 | 1.49186 | 57.4 | 0.51174 | $-6.7107 \times 10^{-6}$ | $-4.61234 \times 10^{-8}$ |
| 2 | 737.592 | 0 | | | | | |
| 3 | 737.592 | 1.5 | 1.58547 | 29.9 | | | |
| 4 | 25.562 | | | | 7.51188 | | $-2.60332 \times 10^{-8}$ |

Distance from the screen to the first surface: 74.6
Distance from the fourth surface to the eyepoint: 15
Effective finder coverage: 95%
f = 68.746
Magnification: 0.756X (52/68.746)
SF1 = −1.042
SF2 = 1.072
$(d_1+d_2+d_3)/f = 0.145$
$f_F/f = 1.085$ 24. An optical system according to claim 1, satisfying the following data table, in which SN denotes a surface number starting from the finder screen side, $r_i$ denotes a radius of curvature (in millimeters) of the ith surface, $d_i$ denotes a distance (in millimeters) between the ith and (i+1)th surfaces, $n_j$ denotes a the d-line, $v_j$ denote's an Abbe number of the jth lens (optical material), $K_i$ denotes a shape factor of a rotating quadratic curved plane for the ith surface, and $A_{6i}$ denotes a triquadratic asphericity coefficient of the ith surface, and wherein the distance from the fourth surface to the eyepoint is 15 mm, the effective finder coverage is 92% and the distance from the finder screen to the first surface is 75.013 mm:

| SN | $r_i$ | $d_i$ | $n_j$ | $v_j$ | $K_i$ | $A_{6i}$ |
|---|---|---|---|---|---|---|
| 1 | 19.175 | 5.70 | 1.49186 | 57.4 | −0.781 | $-1.523 \times 10^{-8}$ |
| 2 | −82.5 | 2.10 | | | | |
| 3 | 82.5 | 1.5 | 1.49186 | 57.4 | | |
| 4 | 18 | | | | | |

Distance from the screen to the first surface: 75.013
Distance from the fourth surface to the eyepoint: 15
Effective finder coverage: 92%
f = 70.719
Magnification: 0.735X (52/70.719)
SF1 = −0.623
$(d_1+d_2+d_3)/f = 0.132$
$f_F/f = 1.061$ 25. In a finder system having a hollow pentaprism for passing light from a screen to an eyepoint, the improvement wherein said finder system further comprises a positive first lens element and a negative second lens element in order from the screen side, wherein both of said first and second lens elements are made of an arcylic resin.

* * * * *

UNITED STATES PATENT AND TRADEMARK OFFICE
CERTIFICATE OF CORRECTION

PATENT NO. : 5,136,427
DATED : August 4, 1992
INVENTOR(S) : Saburo Sugawara

It is certified that error(s) appears in the above-identified patent and that said Letters Patent is hereby corrected as shown below:

Cover page [73] Assignee: Change "Asahi Kogaku K.K. to --Asahi Kogaku Kogyo K.K.--

Signed and Sealed this

Seventeenth Day of October, 1995

Attest:

BRUCE LEHMAN

Attesting Officer — Commissioner of Patents and Trademarks